(12) United States Patent
Carrion et al.

(10) Patent No.: US 10,702,101 B2
(45) Date of Patent: Jul. 7, 2020

(54) CONVERTIBLE GRILL APPARATUS AND PROCESS

(71) Applicants: Jose F. Carrion, Orlando, FL (US); Javier E. Buitrago Ortiz, Orlando, FL (US)

(72) Inventors: Jose F. Carrion, Orlando, FL (US); Javier E. Buitrago Ortiz, Orlando, FL (US)

( * ) Notice: Subject to any disclaimer, the term of this patent is extended or adjusted under 35 U.S.C. 154(b) by 132 days.

(21) Appl. No.: 16/028,601

(22) Filed: Jul. 6, 2018

(65) Prior Publication Data
US 2020/0008619 A1    Jan. 9, 2020

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ....... A47B 95/008; A47B 5/02; A47B 96/067; A47J 2037/0777; A47J 37/0781; A47J 37/0763
USPC ................................................. 248/690–692
See application file for complete search history.

(56) References Cited

U.S. PATENT DOCUMENTS

| | | | |
|---|---|---|---|
| 3,172,402 A * | 3/1965 | Valicla | A47J 37/0763 126/25 R |
| 4,535,749 A | 8/1985 | Schlosser et al. | |
| 6,302,097 B1 * | 10/2001 | Rivera | A47J 37/0763 126/305 |
| 6,951,213 B2 | 10/2005 | Coleman et al. | |
| 7,051,649 B2 | 5/2006 | Lin | |
| 7,284,549 B1 | 10/2007 | Eby et al. | |
| 2005/0252504 A1 * | 11/2005 | Cabrera | A47J 37/0704 126/50 |
| 2006/0219851 A1 * | 10/2006 | Stewart, III | B25H 3/006 248/200 |
| 2006/0288917 A1 * | 12/2006 | Wood | A47B 3/08 108/115 |
| 2009/0114780 A1 * | 5/2009 | Chen | A47B 3/083 248/166 |
| 2010/0213228 A1 * | 8/2010 | Dannewitz | B60P 3/36 224/401 |
| 2015/0068512 A1 * | 3/2015 | Mehler | A47J 33/00 126/25 R |
| 2016/0174701 A1 * | 6/2016 | Boylston | A47B 96/067 108/42 |
| 2017/0231388 A1 * | 8/2017 | Will | A47F 5/083 211/106 |

* cited by examiner

*Primary Examiner* — Jorge A Pereiro
(74) *Attorney, Agent, or Firm* — William M. Hobby, III

(57) ABSTRACT

A barbeque grill is removably mounted to a wall for storage or grilling and is convertible to a free standing table and grill.

10 Claims, 4 Drawing Sheets

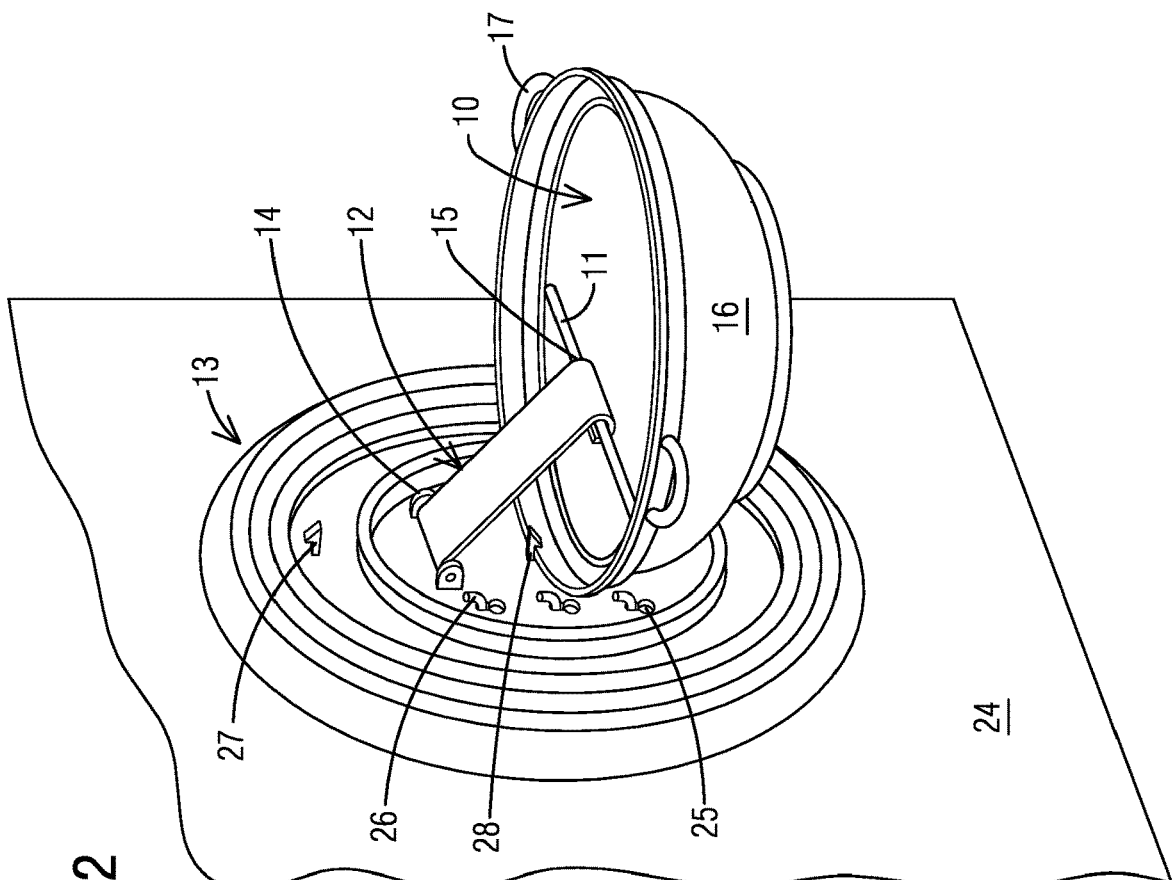
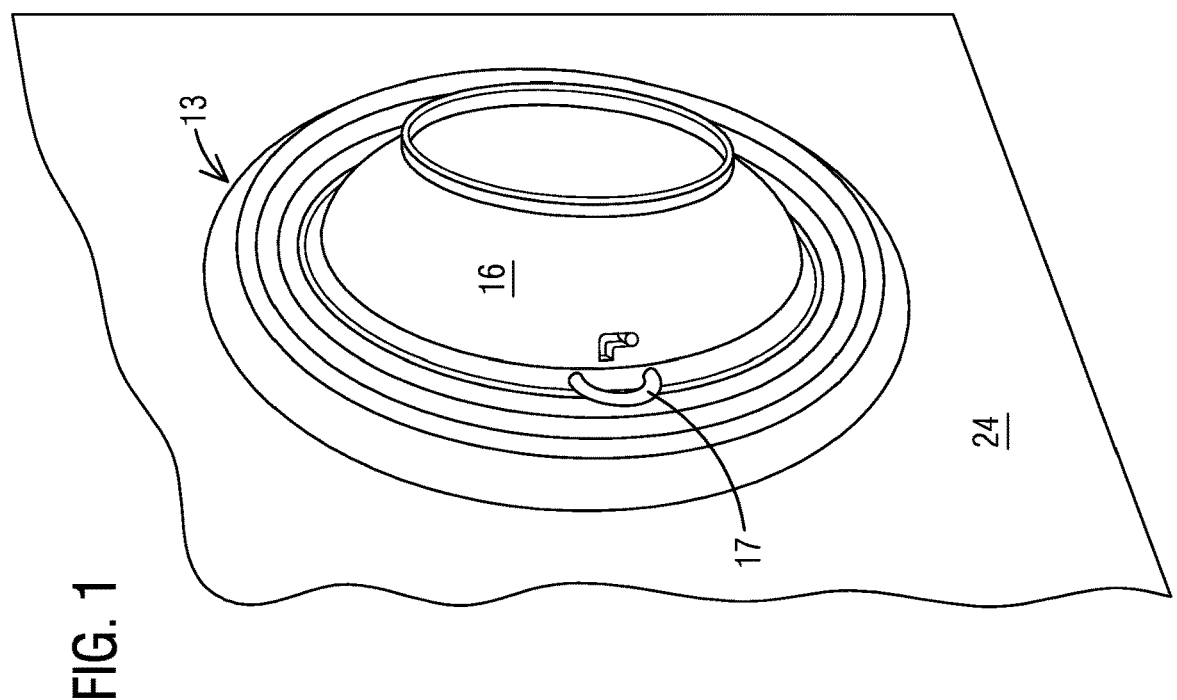

CONVERTIBLE GRILL APPARATUS AND PROCESS

FIELD OF THE INVENTION

This invention relates to a barbeque grill removably mounted to a wall for storage or grilling which is convertible to a free standing table and grill.

BACKGROUND OF THE INVENTION

A barbeque grill is a device for cooking food by applying heat directly below a grill. There are several varieties of grills but most fall into one of two categories, either a gas fueled or a charcoal grill. Barbecuing is a pervasive tradition in much of the world. Grilling has become a popular method of cooking food due to the unique flavors and texture imparted to the food during the grilling process. Grilling can be performed outdoors or indoors.

Charcoal grills use either charcoal briquettes or natural lump charcoal as their fuel source. When burned, the charcoal will transform into embers radiating the heat necessary to cook fuel. There are many different charcoal grill configurations. Some grills are square, round or rectangular, some have lids while others do not, some are portable and some are not. Outdoor grilling of food on patios, or at picnics and in recreational areas or in parks is a popular pass-time used by people all over the world.

Portable barbecue grills may be seen in the U.S. patents to Schlosser et al., U. S. Pat. No. 4,535,749 and to Eby et al., U.S. Pat. No. 7,284,549 and in the Coleman et al. U.S. Pat. No. 6,951,213. A grill that attaches to a recreational vehicle can be seen in U.S. Patent Publication No. 2010/0213228 to Dannewitz while the U.S. Patent to Lin, U.S. Pat. No. 7,051,649, is for a collapsible grill.

There is a wall mounted fold down grill being marketed which has a base plate fixedly mounted to a wall with the grill hinged to the base in a manner that it can be dropped down to a horizontal position for grilling. It can then be folded back against the wall base for storage when not in use.

The present invention is for a grill which is hingedly and removably attached to a table top base having folding legs therein which table top base can be removably attached to a wall. When the table top base is attached to a wall, the grill can be lowered on its hinge to a position for grilling while attached to the wall. The grill can also be removed from the table top base and the base removed from the wall, and the legs opened to form a table for supporting the grill.

SUMMARY OF THE INVENTION

This invention relates to a barbeque grill removably mounted to a wall for storage or grilling which can be converted to a free standing table and grill. A generally saucer-shaped table top has a plurality of foldable legs on one side thereof and is removably attachable to a wall with a hanging bracket having extending hooks fixedly attached to the wall when the legs are folded. The table top is removable from the wall and the legs unfolded to form a table. The table top has a grill hanging hook attached thereto. A grill is attached to the table top with a hinged arm link to allow the grill to rotate on the table top from a stored position to a horizontal open grilling position. The arm link is removably attached to the grill with a hook connection to allow the grill to be removed from the table top when removing the table top from the wall to allow the setting up of the table to support the grill remotely from the wall. Thus a wall mounted grill attached to a table top can be used for grilling while attached to the wall and can be converted to a table capable of supporting the grill thereon.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings:

FIG. 1 is a perspective view of a wall mounted grill attached in a stored position on a wall in accordance with the present invention;

FIG. 2 is a perspective view of the wall mounted grill of FIG. 1 in which the grill is opened to a horizontal position for grilling;

DETAILED DESCRIPTION OF AN EXEMPLARY EMBODIMENT

This invention relates to a barbeque grill removably mounted to a wall for storage or grilling which is convertible to a free standing table and grill.

Figure 4:
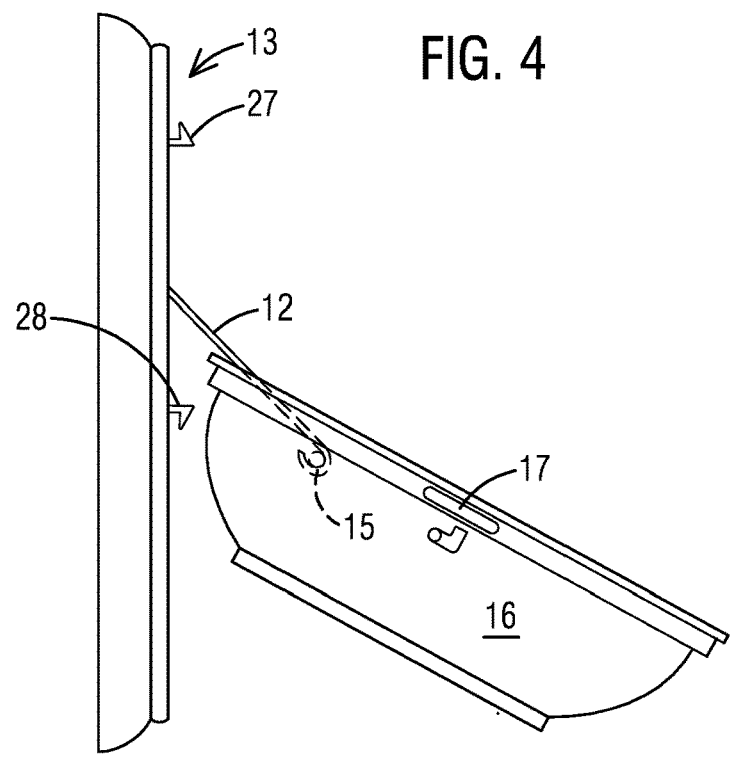
FIG. 4 is a view of a side elevation of the grill of FIGS. 1 through 3 being tilted for removal from the table top.
Figure 5:
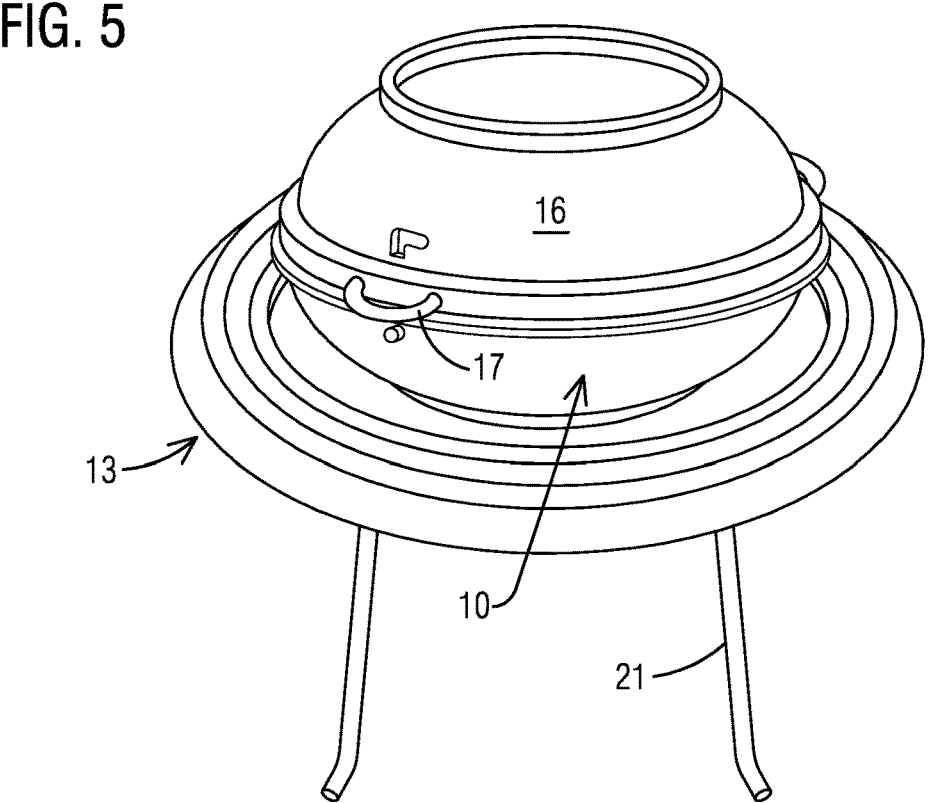
FIG. 5 is a perspective of the wall grill of FIGS. 1 through 4 with the grill on the setup table.
Figure 6:
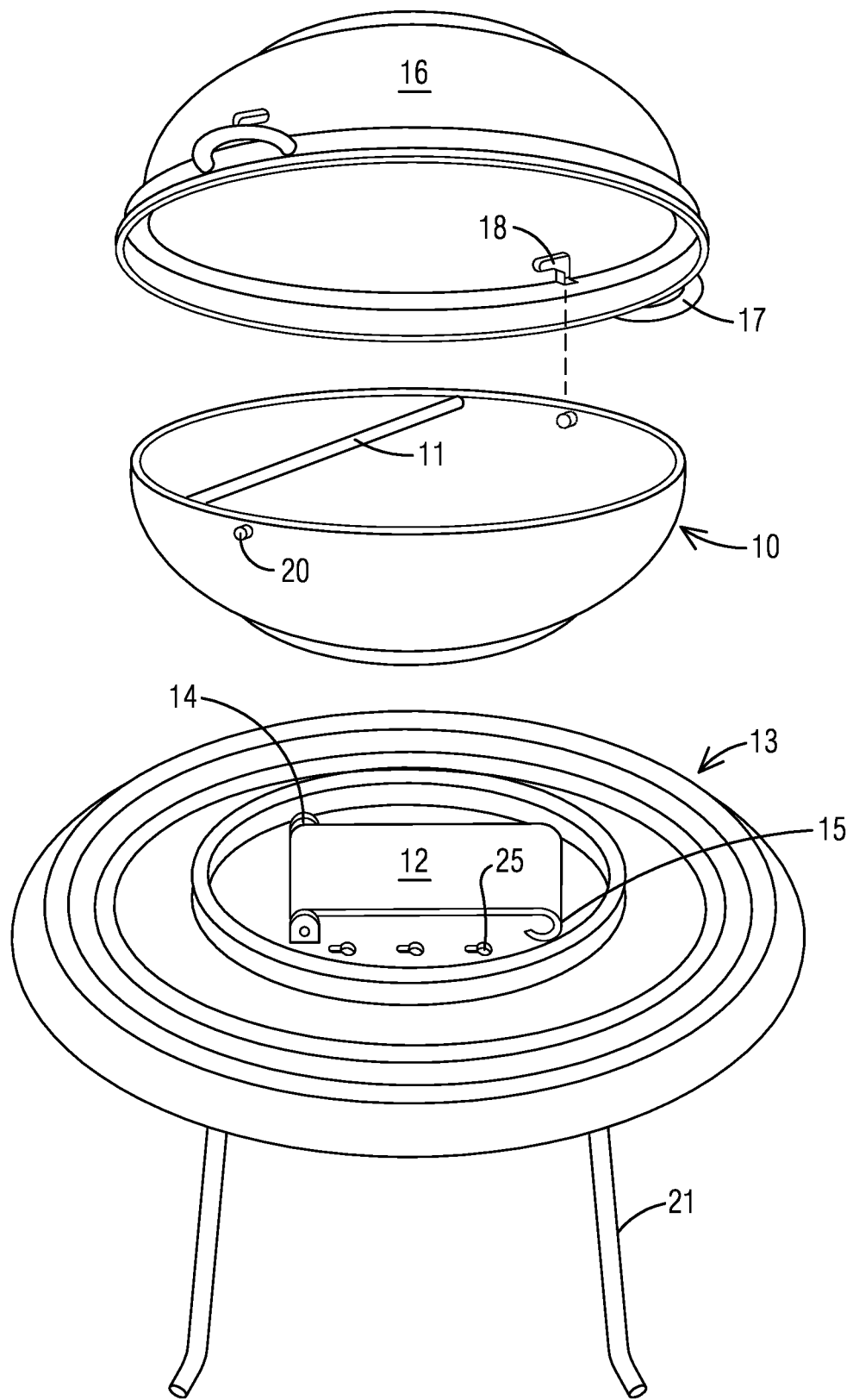
FIG. 6 is an exploded perspective of the wall grill and table of FIGS. 1 through 5.

Referring to the drawings, FIGS. 1 through 6, a wall mounted grill 10 has a hinge rod 11 having an arm link 12 rotatably attached thereto at one end with a hook shaped connection 15. The arm link 12 is hingedly attached to a generally saucer-shaped table top 13 with a hinge 14. The grill can be seen to have grill cover 16 attached over the grill 10. The grill cover 16 has handles 17 and attaching hooks 18 as seen in FIG. 6 for removably attaching to studs 20 on the grill 10.

Figure 3:
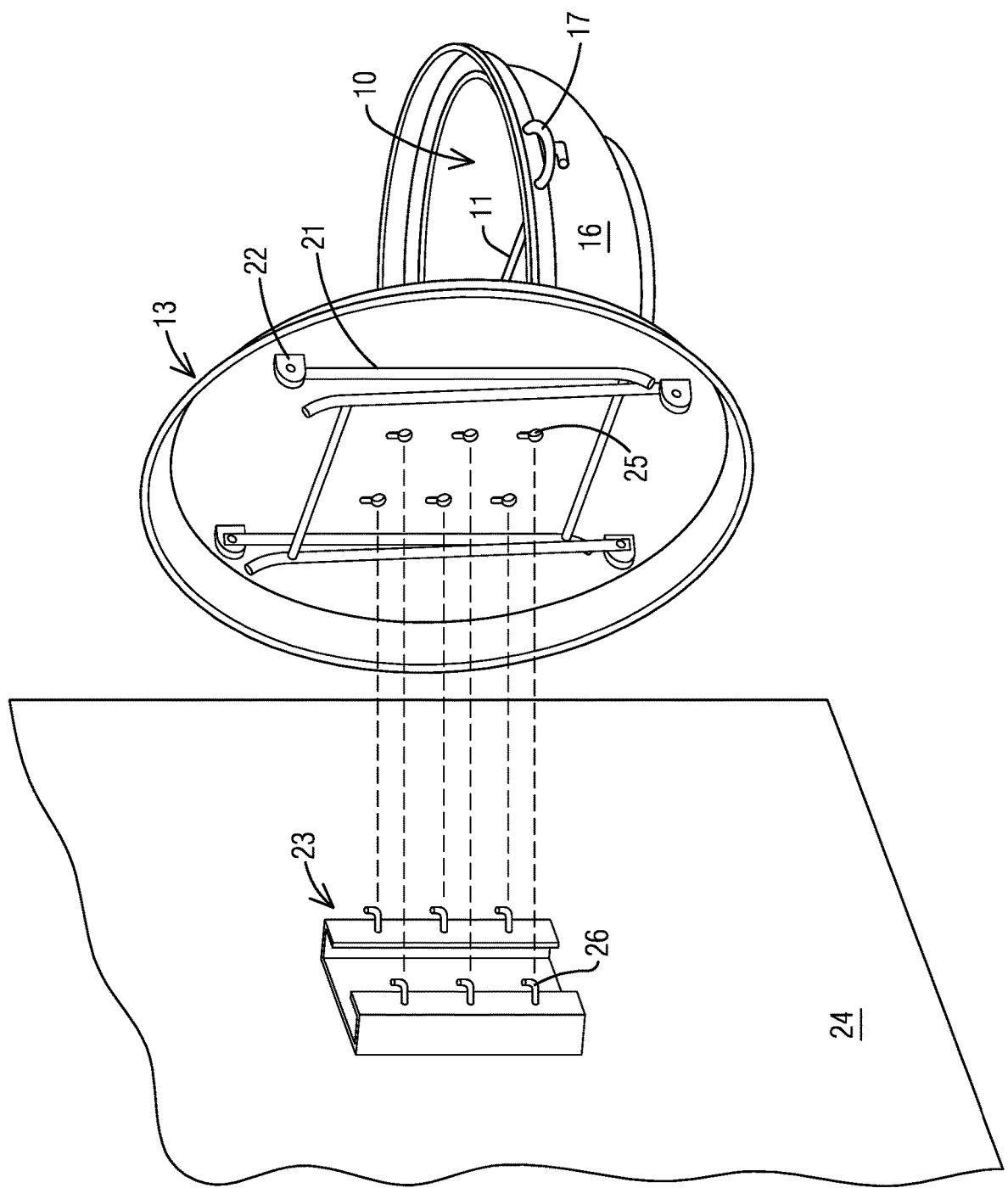
FIG. 3 is an exploded perspective of the grill of FIGS. 1 and 2 showing the folded legs and wall mounting bracket.

The table top 13 as more clearly seen in FIGS. 3, 5 and 6 has a generally saucer-shape having a plurality of folding legs 21 folded therein on hinges 22 as seen in FIG. 3. A wall attaching bracket 23 is fixedly attached to a wall 24 and has a plurality of spaced hooks 26 extending therefrom. The bracket 23 plurality of hooks 26 are aligned to slide into the openings 25 when the grill is removably attached to the wall 24. Each opening 25 has an enlarged portion at the bottom thereof for a hook 26 to extend into or out of. The table top 13 openings 25 can be slid over the bracket 23 hooks 26 and pulled down to hang the table top 13 to removably attach the table top 13 to the bracket 23 and wall 24. This allows the table top 13 to be quickly attached to a wall 24 and removed for use as a table with the legs 21 folded out as seen in FIGS. 5 and 6.

The grill 10 can be stored as seen in FIG. 1 when folded up and with the rim of the grill 10 hanging on the hook 27. The grill 10 has the cover 16 attached to the grill 10 when in a stored position. From the stored position of FIG. 1, the grill 10 can be unhooked from the hook 27 and lowered on the hinged arm link 12 to an open horizontal grilling position as shown in FIG. 2. In the open position, the edge of the grill or cover is attached to the hook 28 while being held by the arm link 12 in the grilling position as shown in FIG. 2. The grill 10 can be unhooked from the hook 28 and swung around and rebooked on the hook 27 for storage.

The grill 10 can be removed from the table top 11 by swinging the grill on the arm link 12 to a position that the grill arm link hook 15 can be unhooked to remove the grill from the table top as shown in FIG. 4.

Once the grill 10 and cover 16 are removed from the table top 13, the table top 13 can be removed from the wall 24 by raising the table top 13 and grill on the wall bracket 23 hooks 26 and removing the grill from hooks 26 extending through the opening 25. Once the table top is removed, the legs 21 can be unfolded as seen in FIGS. 5 and 6 to form a table, such as a picnic table. The grill 10 can then be placed on the table top 13 and the cover 16 placed over the grill 10 as shown in FIG. 5. In this manner the grill 10 can be easily converted from a wall mounted grill to a portable grill and table for use in a picnic or the like.

The wall grill 10 can be easily collapsed and remounted to the wall 24 for storage by simply folding the legs 21 within the saucer-shaped table top 13 and hanging the table top back on the wall 24 hanging bracket 23 by sliding the table top openings 25 over the hooks heads 26. The grill 10 can then be covered with the cover 16 and the link arm reattached to the grill rod 11 and the grill tilted up and hung on the hook 27. It should be noted that the wall mounted convertible grill works equally well with or without the cover 16.

It should be clear at this time that a convertible grill which converts from a wall mounted grill to a table supporting a grill or the like has been provided. However the present invention is not to be considered limited to the forms shown which are to be considered illustrative rather than restrictive.

We claim:

1. A convertible grill system comprising:
    a table top having a plurality of foldable legs on one side thereof, said table top being removably attachable to a wall when said legs are folded, and removable from said wall for unfolding said legs to form a table, said table top having a grill hanging hook attached thereto; and
    a grill attached to said table top with an arm link, said arm link being rotatably attached to said table top and removably attached to said grill to allow said grill to fold on said arm link from a storage position supported on said grill hanging hook to a horizontal open grilling position and to be removed from said table top for unfolding said table top legs to form a table for said grill;
    whereby said grill can be used while attached to the wall and said table attached to a wall can be removed from said wall and converted to a free standing table with said legs unfolded for supporting and using said grill thereon.

2. The convertible grill system in accordance with claim 1 in which said table top is a generally saucer-shaped table top.

3. The convertible grill system in accordance with claim 1 in which said table top has a grill connection member positioned for holding one edge of said grill to said table top when said grill is in an open position.

4. The convertible grill system in accordance with claim 3 in which said grill has a supporting rod therein between sides thereof for removably attaching said arm link.

5. The convertible grill system in accordance with claim 4 in which said hinged arm link is hinged to said table top at one end and has a hook connection to said grill supporting rod to allow said hinged arm link to be unhooked from said grill to remove said grill from said arm link and table top.

6. The convertible grill system in accordance with claim 1 including a grill cover shaped to fit around and removably attached to said grill in a storage position.

7. The convertible grill system in accordance with claim 6 in which said grill cover is shaped to form a grill cover when removed from the storage position.

8. The convertible grill system in accordance with claim 7 in which said grill cover has a pair of attaching hooks for removably attaching said grill cover to said grill.

9. The convertible grill system in accordance with claim 8 having a wall mounted bracket having a plurality of hooks aligned to fit through a plurality of openings in said table top for removably holding said table top and grill to said wall mounted bracket and wall.

10. A process for converting a wall mounted grill to a table top grill comprising the steps of:
    selecting a table top having a plurality of foldable legs on one side thereof, which table top is removably attachable to a wall when said legs are folded, and is removable from said wall for unfolding said legs to form a table, said table top having a grill attached thereto with a hinged arm link, said arm link being rotatably attached to said table top and rotatably and removably attached to said grill to allow said grill to fold on said arm link from a storage position supported on a table top hanger to a horizontal open grilling position and to be removed from said table top for unfolding said table top legs to form a table;
    disconnecting said grill from said table top;
    removing said table top from the wall it is attached to;
    unfolding the foldable legs on said table top to set up a table; and
    positioning said grill on said table top thereby converting a wall mounted grill to a table top grill.

\* \* \* \* \*